(12) United States Patent
Ishiguro

(10) Patent No.: US 7,558,236 B2
(45) Date of Patent: Jul. 7, 2009

(54) COMMUNICATION METHOD AND SYSTEM FOR IMPROVING CONTROL SIGNAL RECEIVING QUALITY DURING HANDOVER

(75) Inventor: Takayuki Ishiguro, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 556 days.

(21) Appl. No.: 10/453,687

(22) Filed: Jun. 4, 2003

(65) Prior Publication Data

US 2003/0228870 A1 Dec. 11, 2003

(30) Foreign Application Priority Data

Jun. 5, 2002 (JP) .............................. 2002-164739

(51) Int. Cl.
*H04W 4/00* (2009.01)
(52) U.S. Cl. ..................... 370/330; 370/329; 370/331; 370/336; 370/337; 455/439; 455/436
(58) Field of Classification Search ................. 455/439; 370/328, 342, 350, 441, 331–334, 341, 335, 370/329, 431, 345, 330; 375/356; 398/78
See application file for complete search history.

(56) References Cited

U.S. PATENT DOCUMENTS

| | | | | |
|---|---|---|---|---|
| 5,117,502 A | * | 5/1992 | Onoda et al. | ................ 455/437 |
| 5,828,659 A | * | 10/1998 | Teder et al. | ................ 370/328 |
| 6,532,364 B1 | * | 3/2003 | Uchida et al. | ............... 455/436 |
| 6,577,617 B1 | * | 6/2003 | Ue et al. | ..................... 370/347 |
| 6,587,449 B1 | * | 7/2003 | Bartolome Pascual et al. | ... 370/336 |
| 6,990,118 B2 | * | 1/2006 | Zeira et al. | .................. 370/458 |
| 2002/0122396 A1 | * | 9/2002 | Terasawa | .................... 370/331 |

FOREIGN PATENT DOCUMENTS

| | | |
|---|---|---|
| DE | 198 13 182 | 9/1999 |
| EP | 1 087 630 | 3/2001 |
| EP | 1 091 609 | 4/2001 |
| EP | 1 185 124 | 3/2002 |
| GB | 2 365 274 | 2/2002 |
| JP | 7-67169 | 3/1995 |
| JP | 7-245784 | 9/1995 |
| JP | 8-205226 | 8/1996 |
| JP | 2002-159046 | 5/2002 |
| WO | WO 00/60893 | 10/2000 |

\* cited by examiner

*Primary Examiner*—George Eng
*Assistant Examiner*—Muthuswamy G Manoharan
(74) *Attorney, Agent, or Firm*—Oblon, Spivak, McClelland, Maier & Neustadt, P.C.

(57) ABSTRACT

A control device for carrying out control of first and second radio base stations at a time of handover from a first radio base station to a second radio base station in radio communications between a radio terminal and a radio base station is provided to prevent the use of signals other than the control signals currently used in the areas before and after the moving, in the same channel as the control signals currently used in the moving target area, during the handover, such that it is possible to improve the receiving quality of the control signals at the radio terminal.

7 Claims, 3 Drawing Sheets

COMMUNICATION METHOD AND SYSTEM FOR IMPROVING CONTROL SIGNAL RECEIVING QUALITY DURING HANDOVER

BACKGROUND OF THE INVENTION

1. Field of the Invention

The present invention relates to communication method and system and a control device for controlling communications when a radio terminal moves between areas in the radio communication such as that of the CDMA scheme that is carried out between a mobile radio terminal and a radio base station

2. Description of the Related Art

In the radio communications using the CDMA scheme, the radio terminal measures a receiving quality of control signals transmitted by the other radio base stations with which it is currently not in communication, according to a command of a control device or a judgement of the radio terminal. This receiving quality may include a receiving power and a signal to noise ratio.

Also, in the conventional radio communication such as that of the CDMA scheme, the radio base station transmits the identical control signals to the radio terminals located inside its controlling area, while also transmitting communication signals as signals for speech communication (data communication), and the control device adopts a scheme for code division multiplexing the communication signals with the control signals according to the need.

However, at a time of the handover in which the radio terminal moves to another neighboring area, the radio terminal is going to receive the control signals transmitted by the radio base station which controls a moving target area, and at that point, if the other communication signals are code division multiplexed in the same time-slots as the received control signals at the moving target area, there has been a problem that the receiving quality of the control signals transmitted from the radio base station at the moving target area will be degraded.

Here, in order to prevent the degradation of the receiving quality at a time of the handover, it is also possible to use a scheme for not code division multiplexing any other signals with the control signals, but this scheme has a problem that the number of available time-slots is reduced so that the communication capacity of the entire communication system becomes small.

BRIEF SUMMARY OF THE INVENTION

It is therefore an object of the present invention to provide communication method and system and a control device capable of preventing the degradation of the receiving quality at a time of the handover in which the radio terminal moves to a neighboring area.

According to one aspect of the present invention there is provided a control device for carrying out control of first and second radio base stations at a time of handover from a first radio base station to a second radio base station in radio communications between a radio terminal and a radio base station, the control device comprising: a control channel determining unit configured to determine a control channel for control signals that are to be transmitted and received between the second radio base station and the radio terminal related to the handover; and a carrier setting unit configured to set a channel other than the control channel determined by the control channel determining unit as a channel for signals other than the control signals that are to be transmitted and received between the first radio base station and another radio terminal other than the radio terminal related to the handover.

According to another aspect of the present invention there is provided a control device for carrying out control of first and second radio base stations at a time of handover from a first radio base station to a second radio base station in radio communications between a radio terminal and a radio base station, the control device comprising: a control channel determining unit configured to determine a control channel for control signals that are to be transmitted and received between the second radio base station and the radio terminal related to the handover; and a carrier setting unit configured to set a channel other than the control channel determined by the control channel determining unit as a channel for signals other than the control signals that are to be transmitted and received between the second radio base station and another radio terminal other than the radio terminal related to the handover.

According to another aspect of the present invention there is provided a communication method for carrying out communication control at a time of handover from a first radio base station to a second radio base station in radio communications between a radio terminal and a radio base station, the communication method comprising: (a) determining a control channel for control signals that are to be transmitted and received between the second radio base station and the radio terminal related to the handover; and (b) setting a channel other than the control channel determined by the step (a) as a channel for signals other than the control signals that are to be transmitted and received between the first radio base station and another radio terminal other than the radio terminal related to the handover.

According to another aspect of the present invention there is provided a communication method for carrying out communication control at a time of handover from a first radio base station to a second radio base station in radio communications between a radio terminal and a radio base station, the communication method comprising: (a) determining a control channel for control signals that are to be transmitted and received between the second radio base station and the radio terminal related to the handover; and (b) setting a channel other than the control channel determined by the step (a) as a channel for signals other than the control signals that are to be transmitted and received between the second radio base station and another radio terminal other than the radio terminal related to the handover.

Other features and advantages of the present invention will become apparent from the following description taken in conjunction with the accompanying drawings.

DETAILED DESCRIPTION OF THE INVENTION

Figure 1:
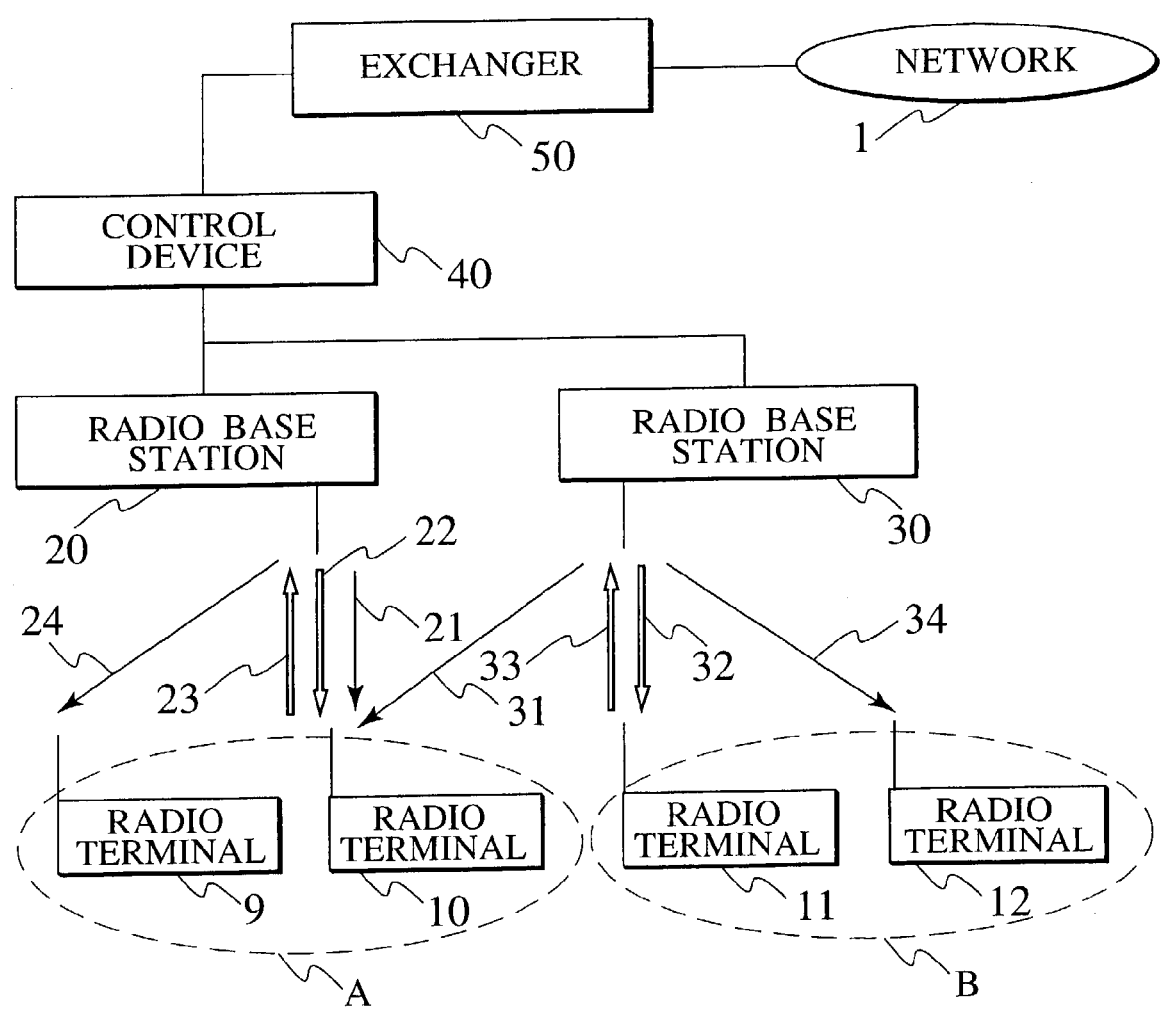
FIG. 1 is a diagram showing an overall configuration of a radio communication system according to one embodiment of the present invention.
Figure 2:
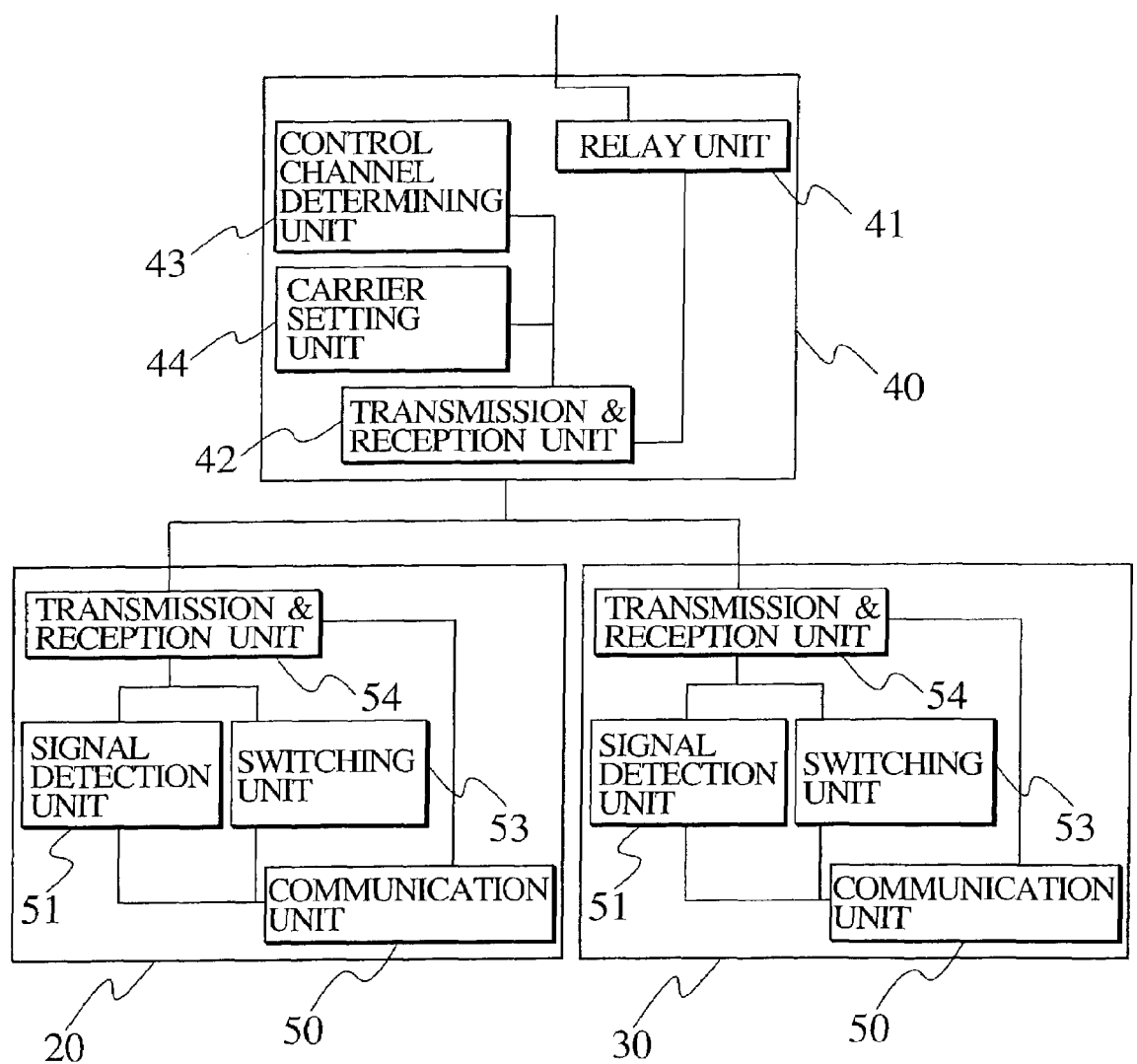
FIG. 2 is a block diagram showing internal configurations of a control device and radio base stations according to one embodiment of the present invention.
Figure 3:
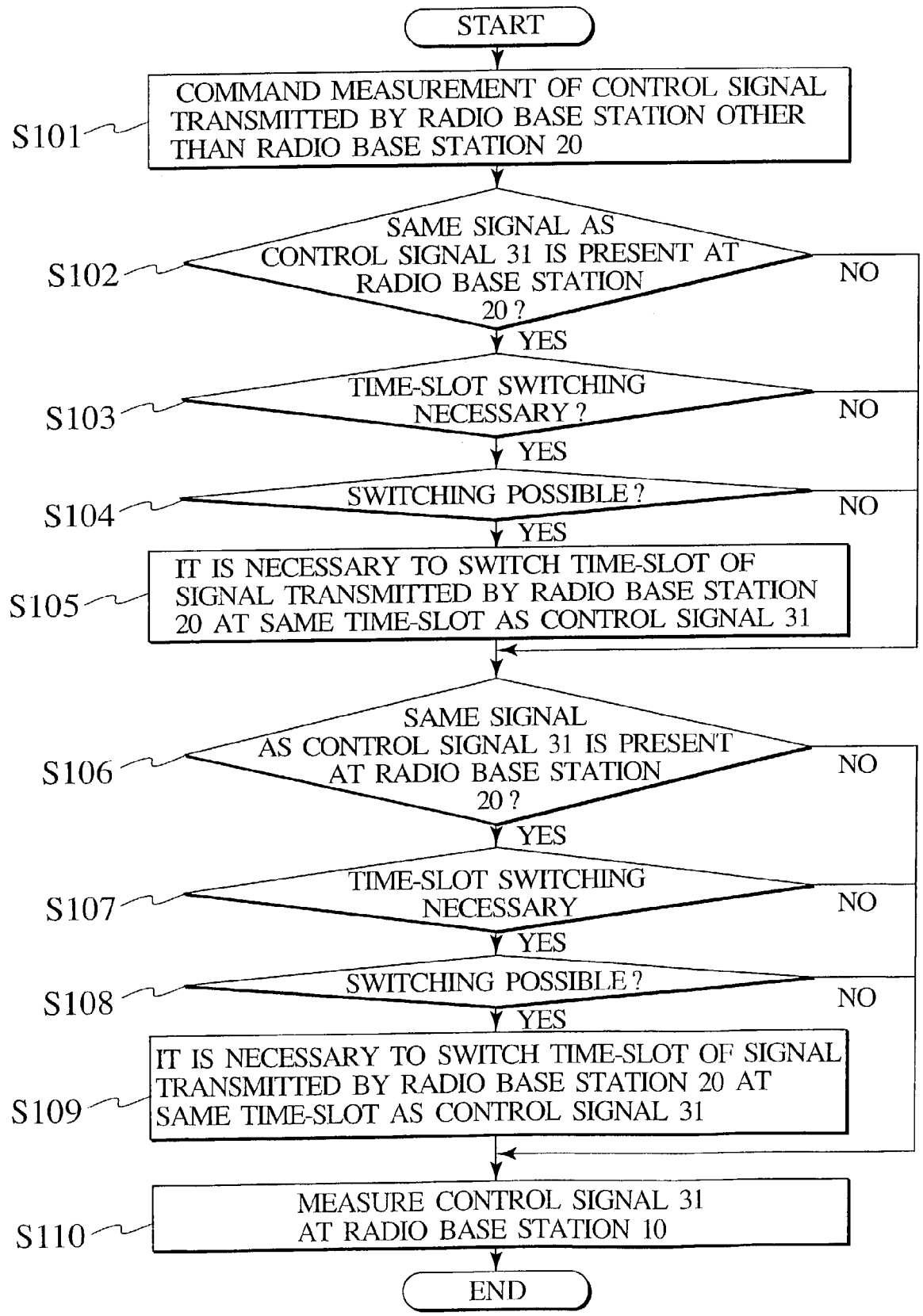
FIG. 3 is a flow chart showing a procedure of a radio communication method according to one embodiment of the present invention.

Referring now to FIG. 1 to FIG. 3, one embodiment of communication method and system according to the present invention will be described in detail.

(Basic Configuration of a Radio Communication System)

FIG. 1 shows an overall configuration of a radio communication system according to this embodiment. Note that, in this embodiment, the exemplary case of the handover in which a radio terminal 10 moves from an area A controlled by a first radio base station 20 to an area B controlled by a second radio base station 30 will be described.

As shown in FIG. 1, the radio communication system of this embodiment comprises radio terminals 9 to 12, radio base stations 20 and 30 for carrying out radio communications with these radio terminals 9 to 12, a control device 40 connected to the radio base stations 20 and 30, an exchanger 50 connected to the control device 40, and a network 1 connected to the exchanger 50.

Here, the radio base station 20 is transmitting communication signals (other than control signals) 22 with respect to the radio terminal 10 in the area A, and the radio terminal 10 is transmitting communication signals 23 with respect to the radio base station 20 in the area A. Also, the radio base station 20 is transmitting communication signals (other than control signals) 24 with respect to the radio terminal 9 in the area A.

On the other hand, the radio base station 30 is transmitting control signals 31, and transmitting communication signals 32 with respect to the radio terminal 11 in the area B, and the radio terminal 11 is transmitting communication signals 33 with respect to the radio base station 30 in the area B. Also, the radio base station 30 is transmitting communication signals (other than control signals) 34 with respect to the radio terminal 12 in the area B.

The radio terminals 9 to 12 are communication terminals for carrying out radio communications such as those of the IMT-2000 CDMA-TDD, for example, with the radio base stations 20 and 30. In the IMT-2000 CDMA-TDD, one frame of 10 ms length contains 15 time-slots, and channels are allocated in units of time-slots. At the same carrier frequency, the synchronization of the time-slots is established among all the radio base stations.

In this embodiment, it is assumed that the frame synchronization is established between the radio base stations 20 and 30, so that the top of the frame is located at the same time. By at least one time-slot in one frame, the radio base station 20 transmits the control signals 21 in the area A and the radio base station 30 transmits the control signals 31 in the area B.

The control device 40 is a device for carrying out relay of signals between the exchanger 50 and the radio base stations 20 and 30, control of handovers regarding the radio base stations 20 and 30, control of channel switching, and allocation of communication channels. As shown in FIG. 2, the control device 40 has a transmission and reception unit 42 for carrying out data transmission and reception which is connected to the radio base stations 20 and 30 as a mechanism for relaying signals, and a relay unit 41 for connecting the exchanger 50 and the transmission and reception unit 42.

Also, as shown in FIG. 2, the control device has a control channel determining unit 43 for determining the control channel for the control signals 21 or 31 that are to be transmitted and received between the first or second radio base station 20 or 30 and the radio terminal 10 related to the handover, as a mechanism for determining time-slots for transmitting the control signals 21 or 31, and a carrier setting unit 44 for setting a channel other than the control channel for the control signals 21 or 31 determined by the control channel determining unit 43, as a channel for communication signals 24 other than the control signals 31 that are to be transmitted and received between the first or second radio base station 20 or 30 and the radio terminal 9 other than the radio terminal 10 related to the handover.

In this embodiment, the control channel determining unit 43 is connected to the transmission and reception unit 42, and connected to a transmission and reception unit 54 of the radio base station 20 or 30 through this transmission and reception unit 42. The control channel determining unit 43 has a function for acquiring channels and time-slots of signals used at each radio base station, determining channels and time-slots for the control signals according to the acquired information, and notifies the determined channels and time-slots to each radio base station. Note that, in this embodiment, it is assumed that the communications signals 22 and 32 are to be transmitted by the time-slot #1 and the communication signals 23 and 33 are to be transmitted by the time-slot #2.

Also, in this embodiment, the carrier setting unit 44 is connected to the transmission and reception unit 42, and connected to the transmission and reception unit 54 of the radio base station 20 or 30 through this transmission and reception unit 42. The channel setting unit 44 has a function for acquiring channels and time-slots of signals used at each radio base station, determining channels and time-slots for signals other than the control signals according to the acquired information, and notifies the determined channels and time-slots to each radio base station.

Also, the carrier setting unit 44 has a function for setting a channel for the communication signals other than the control signals 31 according to the transmission power of the radio signals transmitted by the first or second radio base station 20 or 30. Note that, in this embodiment, the judgement as to whether the communication signals should be switched or not is made according to whether the receiving power measured by the radio terminal exceeds a threshold or not.

As shown in FIG. 2, each one of the radio base stations 20 and 30 has a communication unit 52 for carrying out communications with the radio terminals 9 to 12, a switching unit 53 for switching a channel to be used, and a signal detection unit 51 for detecting signals used by each communication and notifying the detected signals to the control device 40.

(The Radio Communication Method Carried Out by the Radio Communication System)

The radio communication method of the radio communication system in the above described configuration is carried out by the following procedure. FIG. 3 shows a procedure of the radio communication method according to this embodiment.

First, the handover occurs as the radio terminal 10 moves from the area A to the area B, and in response, the control device 40 commands the radio terminal 10 to measure the control signals 31 transmitted by the radio base station 30, in order to carry out the radio terminal management (step S101). The radio terminal 10 measures the control signals 31 according to this command, and transmits the measurement result to the control device 40.

The control device 40 judges whether the radio base station 20 is carrying out the transmission of signals other than the control signals 21 (the communication signals 22 and 24 here) or not at the time-slot by which the control signals 31 are to be transmitted at the area A (step S102). More specifically, the allocation states of the communication signals in use are scanned by the signal detection unit 51 of the radio base station 20, and the scanning result is transmitted to the control device 40. The control device 40 acquires this scanning result and makes the judgement at the control channel determining unit 43. If it is judged that the radio base station 20 is carrying out the transmission of signals other than the control signals 21 at the step S102, the processing proceeds to the step S103, whereas otherwise the processing proceeds to the step S106. Here it is assumed that the communication signals 24 are in the same time-slot as the control signals 31, so that the processing proceeds to the step S103.

At the step S103, the control device 40 judged whether the control signals 21 and the communication signals 22 or 24 that are signals to be transmitted by the radio base station 20 in the same time-slot as the control signals 31 should be switched to the other time-slot or not. In this judgement as to whether the time-slot should be switched or not, it is judged that the time-slot should be switched if the transmission power by which the communication signals 22 or 24 are to be transmitted by the radio base station 20 exceeds a predetermined threshold, as already mentioned above. The control signals 21 should be transmitted by the same time-slot as much as possible, so that the control device 40 judges that the time-slot for the control signals 21 should not be switched as long as the threshold for the control signals is not exceeded. If the control device 40 judges that the time-slot should be switched at the step S103, the processing proceeds to the step S104, whereas otherwise the processing proceeds to the step S106.

At the step S104, the control device 40 judges whether it is possible to switch the communication signals 22 or 24 to the other time-slot or not, according to the allocation states of the other time-slots at the radio base station 20. Namely, when the communication signals 22 or 24 are in the same time-slot as the control signals 31, the time-slot of the communication signals 22 or 24 is switched to the other time-slot. If it is judged that the switching is possible at the control device 40, the processing proceeds to the step S105, whereas otherwise the processing proceeds to the step S106. Then, at the step S105, the control device 40 allocates the communication signals 22 or 24 to the other time-slot at the radio base station 20 according to the need.

At the step S106, the control device 40 judges whether the radio base station 30 is carrying out the transmission of communication signals other than the control signals 31 (the communication signals 32 and 34 here) or not at the time-slot by which the control signals 31 are to be transmitted at the area B. If it is judged that the radio base station 30 is carrying out the transmission of signals other than the control signals 31 at the step S106, the processing proceeds to the step S107, whereas otherwise the processing proceeds to the step S110. Here it is assumed that the communication signals 32 or 34 are used so that the processing proceeds to the step S107.

At the step S107, the control device 40 judged whether the communication signals 32 or 34 that are signals to be transmitted by the radio base station 30 in the same time-slot as the control signals 31 should be switched to the other time-slot or not. If the control device 40 judges that the time-slot should be switched at the step S107, the processing proceeds to the step S108, whereas otherwise the processing proceeds to the step S110.

At the step S108, the control device 40 judges whether it is possible to switch the communication signals 32 or 34 to the other time-slot or not, according to the allocation states of the other time-slots at the radio base station 30. If it is judged that the switching is possible at the control device 40, the processing proceeds to the step S109, whereas otherwise the processing proceeds to the step S110.

At the step S109, the control device 40 allocates the communication signals 32 or 34 to the other time-slot. At the step S110, the radio terminal 10 receives the control signals 31 transmitted by the radio base station 30, and measures the receiving quality.

MODIFIED EMBODIMENTS

Note that, in the above described embodiment, it is possible to reverse the order of the judgement regarding the switching of the time-slot of signals to be transmitted by the radio base station 20 and the judgement regarding the switching of the time-slot of signals to be transmitted by the radio base station 30.

Also, when the radio terminal 10 judges that the control signals 31 should be received, it is possible to request the control device 40 to switch the time-slot of signals to be transmitted at the same time as the control signals 31.

In addition, it is possible to request the measurement of the control signals other than the control signals 21 to be transmitted by the radio base station 20 from the control device 40 to the radio terminal 10, such that the processing from the step S102 on can be carried out at the control device 40 according to this measurement result.

It is also possible to switch the radio signals with the larger transmission power at a higher priority in the case where there are a plurality of radio signals other than the control signals 21 to be transmitted by the radio base station 20 at the same as the control signals 31, and it is also possible to switch the radio signals with the larger transmission power at a higher priority when there are a plurality of radio signals other than the control signals to be transmitted by the radio base station 30 at the same time as the control signals 31.

In addition, it is possible to execute the above described processing only in the case where the receiving quality of the control signals 31 at the radio terminal 10 is degraded. In this case, at the above described step S101, it is preferable to command the measurement of the control signals other than the control signals to be transmitted by the radio base station 20 from the control device 40 to the radio terminal 10, receive the control signals 31 at the radio terminal 10, and report the degradation of the measured receiving quality of the control signals 31 from the radio terminal 10 to the control device 40 when the receiving quality of the control signals 31 is less than or equal to a predetermined value.

It is also possible to execute the processing according to this embodiment even when the radio terminal 10 is currently not in communication with the radio base station 20. Namely, when the radio terminal 10 judges that the control signals 31 should be received, the communication with the radio base station 20 on standby is established, the measurement of the control signals other than the control signals 21 to be transmitted by the radio base station 20 is requested to the control device 40 through the radio base station 20, and the control device 40 executes the processing of the step S102 on.

(Effects of the Radio Communication System and the Radio Communication Method)

According to the communication system and the communication method of this embodiment, when the radio terminal 10 receives the control signals 31, the communication signals in the same time-slot as the control signals 31 are reduced at the radio base station 20 and the radio base station 30, such that the receiving quality of the control signals 31 at the radio terminal 10 can be improved. In addition, the receiving quality can be improved even at the other radio terminals 9, 11 and 12 that have been carrying out communications by using the same time-slot as the control signals 31. Also, as the receiving quality of the control signals 31 at the radio terminal 10 is improved, the control device 40 can carry out the code division multiplexing of the communication signals with the control signals 31, so that the capacity can be increased.

As described above, according to the communication system, the communication method and the control device of the present invention, at a time of the handover in which the radio terminal moves to a neighboring area, it is possible to prevent the degradation of the receiving quality by reducing the code division multiplexing in the same time-slot as the control signals to be transmitted from another neighboring radio base station.

According to the present invention, it becomes possible to prevent the use of signals other than the control signals currently used in the areas before and after the moving, in the same channel (time-slot, etc.) as the control signals currently used in the moving target area, during the handover. Consequently, it is possible to prevent the code division multiplexing of the other communication signals with the control signals from the moving target radio base station that are to be received by the radio terminal related to the handover, and therefore it is possible to improve the receiving quality of the control signals at the radio terminal.

It is also possible to set a channel for signals other than the control signals according to the transmission power of radio signals transmitted by the radio base station. In this case, it is possible to judge the occurrence of interferences according to the size of the transmission power, so that it is possible to carry out the channel switching only when it is necessary.

This judgement according to the transmission power can be made by setting the transmission power that can potentially cause interferences as a threshold, and judging whether this threshold is exceeded or not. When the threshold is set in this way, it is possible to judge the occurrence of interferences quickly so that it is also possible to improve the processing speed.

Also, by carrying out the measurement of the transmission power at the radio terminal side, it becomes possible to set a channel according to the receiving state at the radio terminal side so that it becomes possible to reduce interferences during the handover more effectively.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A control device for carrying out control of a first radio base station and a second radio base station at a time of handover from the first radio base station to the second radio base station in radio communications using a channel in which signals are code division multiplexed in time-slots, the time-slots including a control signal time-slot for control signals and a non control signal time-slot for non control signals, the control device comprising:
    a control channel determining unit configured to determine the control signal time-slot used to transmit and receive the control signals between the second radio base station and a radio terminal related to the handover, to judge whether the control signal time-slot is the same as a first non control signal time-slot used to transmit and receive non control signals between the first radio base station and another radio terminal other than the radio terminal related to the handover, and to judge whether the control signal time-slot is the same as a second non control signal time-slot used to transmit and receive non control signals between the second radio base station and the another radio terminal; and
    a carrier setting unit configured to switch at least one of the first and second non control signal time-slots to be in a time-slot other than the control signal time-slot determined by the control channel determining unit, when it is judged that the control signal time-slot is the same as the at least one of the first and second non control signal time-slots.

2. The control device of claim 1, wherein the carrier setting unit is configured to set the at least one of the first and second non control signal time-slots according to a transmission power of radio signals transmitted by the first radio base station or the second radio base station, respectively.

3. The control device of claim 1, wherein a synchronization of the time-slots is established between the first radio base station and the second radio base station.

4. The control device of claim 1, wherein
    the carrier setting unit is configured to switch the at least one of the first and second non control signal time-slots with the larger transmission power at a higher priority to be in a time-slot other than the control signal time-slot determined by the control channel determining unit, when there are a plurality of non control signals to be transmitted from the first or second radio base station to a plurality of radio terminals other than the radio terminal related to the handover.

5. The control device of claim 1, wherein
    the carrier setting unit is configured to switch the at least one of the first and second non control signal time-slots to be in a time-slot other than the control signal time-slot, when it is judged that the control signal time-slot is the same as the at least one of the first and second non control signal time-slots and the receiving quality of the control signals at the radio terminal related to the handover is degraded.

6. The control device of claim 2, wherein the carrier setting unit is configured to acquire information on the transmission power, as measured by the radio terminal, and to set the at least one of the first and second non control signal time-slots according to the information on the transmission power as acquired.

7. A communication method for carrying out communication control at a time of handover from a first radio base station to a second radio base station in radio communications using a channel in which signals are code division multiplexed in time-slots, the time-slots including a control signal time-slot for control signals and a non control signal time-slot for non control signals, the communication method comprising:
    determining the control signal time-slot used to transmit and receive the control signals between the second radio base station and a radio terminal related to the handover;
    judging whether the control signal time-slot is the same as a first non control signal time-slot used to transmit and receive non control signals between the first radio base station and another radio terminal other than the radio terminal related to the handover;
    judging whether the control signal time-slot is the same as a second non control signal time-slot used to transmit and receive non control signals between the second radio base station and the another radio terminal; and
    switching at least one of the first and second non control signal time-slots to be in a time slot other than the determined control signal time-slot when it is judged that the control signal time-slot is the same as the at least one of the first and second non control signal time-slots.

* * * * *